United States Patent Office 3,010,188
Patented Nov. 28, 1961

3,010,188
METHOD OF SECURING CERAMIC ARTICLES TO ONE ANOTHER OR TO METAL ARTICLES
Arie Bol and Christiaan Alfons Maria Klaassen, Eindhoven, Netherlands, assignors, by mesne assignments, to North American Philips Company, Inc., New York, N.Y., a corporation of Delaware
No Drawing. Filed Apr. 22, 1954, Ser. No. 425,054
Claims priority, application Netherlands May 12, 1953
7 Claims. (Cl. 29—180)

The invention relates to a method of securing ceramic articles to one another or to metal articles.

Several methods have been proposed in which the ceramic articles had a metal layer applied to them, usually a silver layer produced by firing a suspension or solution of a silver compound to the articles, whereupon the connection was established by soldering. These methods have a limitation in that in the soldering process special measures have to be taken to prevent the applied metal layers from being dissolved in the solder excessively. A further limitation consists in that, if no refractory metals, such as iron, are used for the intermediate layer, only so-called soft solder, such as a lead-tin compound, is suitable to make the joint and consequently the mechanical strength and the heat resistance of the joint are too weak in many uses. It is true that the use of a refractory metal such as iron, for the intermediate layer enables hard solder to be used with resultant increase of the heat resistance and the mechanical strength, but in this event the necessity of using a reducing gas atmosphere means an additional complication in carrying out the method.

On the other hand methods are known in which the ceramic articles are not previously provided with an intermediate metal layer and the joint is made directly by the interposition of a fusible layer. Of these methods particularly that in which titanium hydride or zirconium hydride are used has acquired a special reputation since this enables very strong vacuum-tight joints to be obtained which are resistant to comparatively high temperatures. A limitation consists, however, in that the required heating process has to be carried out in a non-oxidizing atmosphere, for example hydrogen, or in a vacuum at temperatures of between 800 and 1200°.

According to the invention the joint is made in that a mixture of finely powdered silver oxide and/or silver and copper oxide and/or copper is applied between the articles and subsequently heated in a non-reducing atmosphere to a temperature exceeding 945° C.

The method can be carried out with ceramic articles of widely different composition, such as a porcelain, steatite, forsterite and materials containing titanium oxide or zirconium oxide, also in the form of titanates and zirconates. The method can also be used with articles consisting of semi-conducting substances, such as silicon carbide and sintered resistance materials, for example, containing substantially $Fe_2O_3$ and a proportion of a few percent $TiO_2$ and in addition with articles consisting of magnetic ferrites, for example zinc ferrite and iron compounds of hexagonal structure, for example $BaO.6Fe_2O_3$. A condition is only that the ceramic materials are resistant to the said high temperatures in a non-reducing atmosphere.

In addition, the method according to the invention permits of joining widely different metals to ceramic materials, for example silver, copper, nickel and nickel-chromium, ferro-chromium and nickel-iron alloys.

By using the method according to the invention very strong vacuum-tight joints are obtainable which are equivalent to those obtained with the use of hydrides of titanium and zirconium. The high quality of the joints obtained seems to be substantially due to the strong wetting action of the copper oxide, or of the produced Ag-$Cu_2O$-alloy upon ceramic material and metals.

In carrying out the method of the invention it is substantially immaterial whether the silver is used in the form of metal or of oxide, since silver oxide when heated is invariably converted into metal and copper when heated in an oxidizing atmosphere is invariably converted into the oxide.

The $Cu_2O$ content of the mixture has a slight influence upon the result. If this content is low, the wetting and consequently the adhesion will be less. Already at a weight ratio of the components, reckoned with respect to $Ag_2O:Cu_2O$, of 100:1 a satisfactory joint is obtainable. The best results are produced with the use of mixtures having a weight ratio $Ag_2O:Cu_2O$ of between 20:1 and 10:1. Since $Cu_2O$ is only soluble in silver to a restricted extent and forms with silver an eutectic melting at 945°, the use of a high $Cu_2O$ content will reduce the mechanical strength due to the presence of a comparatively large amount of free $Cu_2O$ in the joining layer. Mixtures in which the ratio $Ag_2O:Cu_2O$ is less than 2:1 produce joints which are to weak in practice.

The finely powdered mixture of the components may, for example with the use of a solution of nitrocellulose in a mixture of butyl acetate and ethyl acetate, be worked into a paste. It is also possible to utilize the powder simply mixed with water. The paste which, for example, contains 10 parts of $Cu_2O$ to 100 parts of $Ag_2O$ is then applied between the articles required to be joined. After heating to a temperature of for example 950–1000°, for example in air, the Ag-$Cu_2O$ alloy produced flows and after cooling a joint of high quality is obtained. The heating process may also be carried out in vacuo, in nitrogen or some other non-reducing atmosphere, which, however, if copper is present in the mixture in metallic form, must invariably be sufficiently oxidizing for the copper to be converted into $Cu_2O$.

If a metal current lead, for example a copper rod, is to be joined to a semi-conductive resistor produced by heating a mixture of $Fe_2O_3$ and about 1% of $TiO_2$ for 1 hour at a temperature of 1220° in air, one may proceed as follows. A slight supply of a paste containing 5 parts of $Cu_2O$ to 100 parts of $Ag_2O$ is heated precisely to melting point on the metal rod. The resistor which is heated at the point at which the current lead is to be arranged is subsequently brought into contact with the melt. After cooling a strong joint of high conductivity is obtained. Alternative mixtures permitting serviceable joints to be produced contain for example 1, 3, 7, 20 and 30 weight parts of $Cu_2O$ to 100 weight parts of $Ag_2O$, reckoned with respect to the oxides.

For the sake of completeness it should be mentioned that it has already been proposed to apply metal layers to ceramic articles by coating the articles with a mixture of silver oxide and/or silver and copper oxide and/or copper and subsequently heating in a non-reducing atmosphere. Since the usual metallizing masses for the production of direct welding joints, consequently without the use of solder, are not suitable, it was, however, not to be expected that the metallizing mass suggested hereinbefore would be suitable and that in this manner joints of high quality could be obtained between ceramic articles or between ceramic and metal articles.

What is claimed is:

1. A method of joining two heat resistant articles together at least one of which is a ceramic article comprising the steps, applying to opposing surfaces of said articles a powdery mixture consisting of a silvery substance selected from the group consisting of silver and silver oxide and mixtures thereof and a coppery substance selected from the group consisting of copper and copper oxide and mixtures thereof, the ratio by weight of the silvery substance calculated as $Ag_2O$ to the coppery substance calculated as $Cu_2O$ being from 2:1 to 100:1, bringing said coated opposing surfaces into contact with each other and then heating said surfaces at a temperature exceeding 945° C. but less than the temperature at which any change in said heat resistant articles occurs, in an atmosphere containing at least sufficient oxygen to oxidize all the coppery substance present in said mixture to $Cu_2O$, for a time sufficient to melt said mixture.

2. A method of joining two heat resistant ceramic articles together, comprising the steps, applying to opposing surfaces of said articles a powdery mixture consisting of a silvery substance selected from the group consisting of silver and silver oxide and mixtures thereof and a coppery substance selected from the group consisting of copper and copper oxide and mixtures thereof, the ratio by weight of the silvery substance calculated as $Ag_2O$ to the coppery substance calculated as $Cu_2O$ being from 10:1 to 20:1, bringing said coated opposing surfaces into contact with each other and then heating said surfaces at a temperature exceeding 945° C. but less than the temperature at which any change in said heat resistant articles occurs, in an atmosphere containing at least sufficient oxygen to oxidize all the coppery substance present in said mixture to $Cu_2O$, for a time sufficient to melt said mixture.

3. A method of joining a heat resistant ceramic article to a heat resistant metallic article, comprising the steps, applying to opposing surfaces of said articles a powdery mixture consisting of a silvery substance selected from the group consisting of silver and silver oxide and mixtures thereof and a coppery substance selected from the group consisting of copper and copper oxide and mixtures thereof, the ratio by weight of the silvery substance calculated as $Ag_2O$ to the coppery substance calculated as $Cu_2O$ being from 10:1 to 20:1, bringing said coated opposing surfaces into contact with each other and then heating said surfaces at a temperature exceeding 945° C. but less than the temperature at which any change in said heat resistant articles occurs, in an atmosphere containing at least sufficient oxygen to oxidize all the coppery substance present in said mixture to $Cu_2O$, for a time sufficient to melt said mixture.

4. The method of claim 3 wherein the heating step is carried out in air.

5. An article comprising a pair of spaced heat resistant members, at least one of said members having a ceramic composition and a layer of a cuprous oxide-silver alloy disposed between and joining said heat resistant members, the ratio by weight of the silver in said alloy calculated as $Ag_2O$ to the copper oxide, calculated as $Cu_2O$ being from 2:1 to 100:1, said heat resistant members being inert at the temperature employed in forming said alloy layer, said temperature being in excess of 945° C.

6. An article comprising a pair of spaced heat resistant ceramic members and a layer of a cuprous oxide-silver alloy disposed between and joining said heat resistant members, the ratio by weight of the silver in said alloy calculated as $Ag_2O$ to the copper oxide, calculated as $Cu_2O$ being from 2:1 to 100:1, said heat resistant members being inert at the temperature employed in forming said alloy layer, said temperature being in excess of 945° C.

7. An article comprising a heat resistant metallic member and a heat resistant ceramic member spaced therefrom and a layer of a cuprous oxide-silver alloy disposed between and joining said heat resistant members, the ratio by weight of the silver in said alloy calculated as $Ag_2O$ to the copper oxide, calculated as $Cu_2O$ being from 2:1 to 100:1, said heat resistant members being inert at the temperature employed in forming said alloy layer, said temperature being in excess of 945° C.

References Cited in the file of this patent

UNITED STATES PATENTS

| | | |
|---|---|---|
| 1,350,907 | Yanai | Aug. 24, 1920 |
| 2,010,145 | Eitel | Aug. 6, 1935 |
| 2,253,026 | Godsey | Aug. 19, 1941 |
| 2,282,106 | Underwood | May 5, 1942 |
| 2,422,628 | McCarthy | June 17, 1947 |
| 2,454,270 | Braundorff | Nov. 23, 1948 |
| 2,482,178 | Harris | Sept. 20, 1949 |
| 2,509,909 | Davis | May 30, 1950 |
| 2,539,298 | Doty | Jan. 23, 1951 |
| 2,570,248 | Kelley | Oct. 9, 1951 |
| 2,600,220 | Doeker | June 10, 1952 |
| 2,617,742 | Olson | Nov. 11, 1952 |
| 2,676,117 | Colbert | Apr. 20, 1954 |
| 2,771,969 | Brownlow | Nov. 27, 1956 |